United States Patent [19]

Hartwig et al.

[11] 4,194,831

[45] Mar. 25, 1980

[54] OPTICAL COPIER

[75] Inventors: Karl Hartwig, Unterhaching, Fed. Rep. of Germany; Gottfried Waibel, Rossleithen, Austria

[73] Assignee: AGFA-Gevaert, A.G., Leverkusen, Fed. Rep. of Germany

[21] Appl. No.: 969,480

[22] Filed: Dec. 14, 1978

[30] Foreign Application Priority Data

Dec. 23, 1977 [DE] Fed. Rep. of Germany ....... 2757850

[51] Int. Cl.² .................... G03G 15/00; G03B 27/54
[52] U.S. Cl. ........................................ 355/3 R; 355/67
[58] Field of Search .................. 355/67, 70, 71, 75, 355/3 R, 8, 11, 14, 47–51

[56] References Cited

U.S. PATENT DOCUMENTS 3,712,731  1/1973  Shiina ............................... 355/71
3,771,082  11/1973  Matsumoto ........................ 355/67
4,118,119  10/1978  Maiorano ....................... 355/3 R X Primary Examiner—Donald A. Griffin
Attorney, Agent, or Firm—Michael J. Striker

[57] ABSTRACT

An optical copier has a transparent support on which an imaging area is bounded by a frame having at least one abutment edge for an original to be copied which is placed on the support. To guard against a possibly remaining gap between original and abutment edge being reproduced in the copy as a dark area, the underside of the support facing away from the original is provided with a transparent or semi-transparent strip extending along the abutment edge and projecting beyond the same into the imaging area by about 1–5 mm. A surface of the strip facing towards an optical imaging system is light-scattering.

11 Claims, 2 Drawing Figures

OPTICAL COPIER

BACKGROUND OF THE INVENTION

1. Field of the Invention

This invention relates to copying apparatus.

More particularly, the present invention relates to optical copying apparatus.

2. The Prior Art

Optical copiers are widely known, including—but not limited to—electrostatic copiers. All optical copiers have in common that the material to be copied, hereafter called "the original" for convenience, is scanned by a lens system which reproduces an image of the original on an intermediate image carrier. This image is then transferred to a copy carrier (e.g. a sheet of copy paper). All of this is known per se.

Usually, the original is placed onto a transparent support through which it can be scanned. To aid in proper positioning of the original, optical copiers generally have a portion of a frame, of the housing or of some other member, which forms on or adjacent the transparent support an abutment edge against which an edge of the original is placed.

Sometimes, e.g. when a copy is being made in haste or when the operator is simply careless, the edge of the original is not properly placed against the abutment edge, leaving a gap between them. When a copy is then made, this gap will show up on the copy as a dark area (usually strip-shaped) which detracts from the appearance of the finished copy.

To eliminate this problem it has been proposed in German Gebrauchsmuster 6,916,869, to provide on the upper surface of the transparent support a cover strip which extends along the abutment edge. The underside of this strip, i.e. the side facing towards the reproducing lens, has a light-reflecting character approximately equal to that of the most commonly reproduced originals. A part of the original, extending along the edge which is to be placed against the abutment edge, then overlies this strip. Thus, even if there is some gap between the abutment edge and the edge of the original, the gap (which is not usually very wide) will coincide with the strip, and due to the reflectivity characteristic of the strip the gap will not show up on the copy as a dark strip.

This proposal is basically satisfactory. However, further improvements beyond it are desirable for several reasons. The strip is provided on the same surface of the transparent support onto which the original is placed; thus, even though it is thin, the strip does sometimes interfere with the positioning of the original. Furthermore, over a period of time the strip can become damaged by the constant contact with the originals, which will evidently defeat its role of suppressing the occurrence of a dark strip on the copies. Most importantly, however, it is proposed to make the strip as a strip of lacquer or the like which is applied to the transparent support, in order for it to be as thin as possible and to avoid interference with the proper positioning of the original. In these cases, however, it is almost impossible to accommodate the reflection capability of the strip so closely to that of the originals as to avoid the appearance of the undesired dark strip on the copy, if a gap does occur between the edge of the original and the abutment edge of the copier.

Another problem requiring correction—one which is not addressed in the prior art—is that an undesired dark strip will often occur on the copy along the edge of the (reproduced) original which is opposite to the edge that is to be placed against the abutment edge. This can happen if the format of the original does not exactly coincide with the image-delimiting boundaries in the plane of the original (i.e. on or at the transparent support) and in the plane of the intermediate copy carrier, and if the underside of the cover which is normally placed over the original during the copying operation does not have a reflection capability close enough to that of the original, or if this cover has not been placed over the original at all, or (e.g. in the event a thick original is copied, such as a book) the underside of this cover is spaced by a relatively large distance from the surface of the transparent support on which the original rests.

SUMMARY OF THE INVENTION

It is an object of the present invention to overcome the disadvantages of the prior art.

More particularly, it is an object of the invention to provide an improved optical copier which is not possessed of these disadvantages.

Another object is to provide such an improved optical copier wherein those disadvantages are overcome in a simple and reliable manner.

In keeping with these objects, and with still others which will become apparent hereafter, one aspect of the invention resides, in an optical copier, in a combination comprising a transparent support for an original to be copied, an abutment edge in part delimiting an image area and against which the original should be but sometimes is not abutted, optical means for scanning the original on the support to produce an image of the original for copying purposes, and at least semi-transparent light-scattering means outside the focal plane of the optical means and adjacent the abutment edge, for preventing the reproduction of a gap between the abutment edge and original as a dark area on a copy being made of the original.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
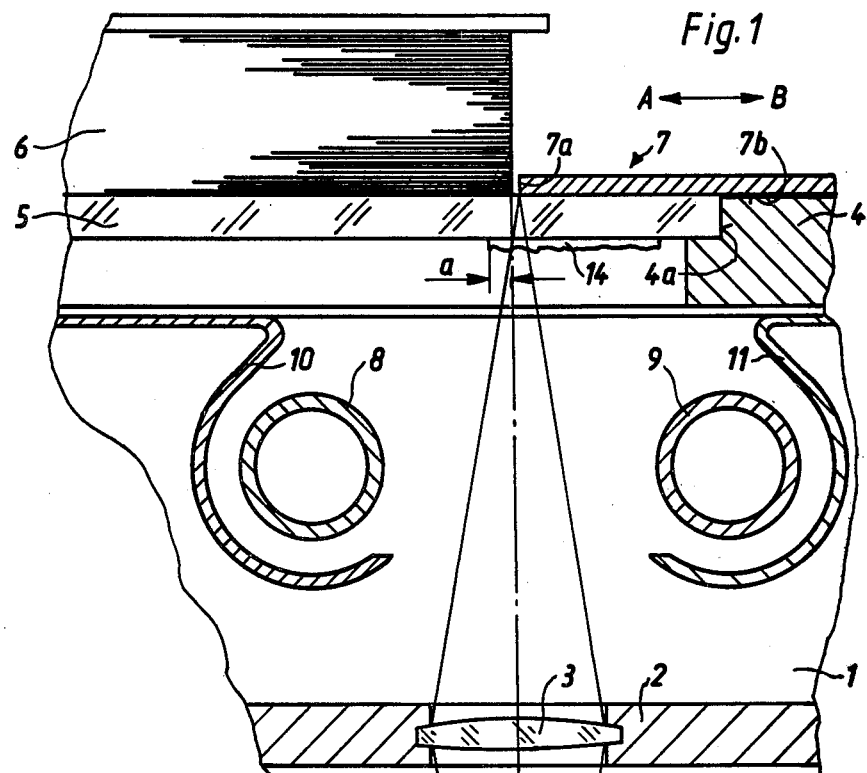
FIG. 1 is a somewhat diagrammatic fragmentary vertical section through a copier embodying the invention.
Figure 2:
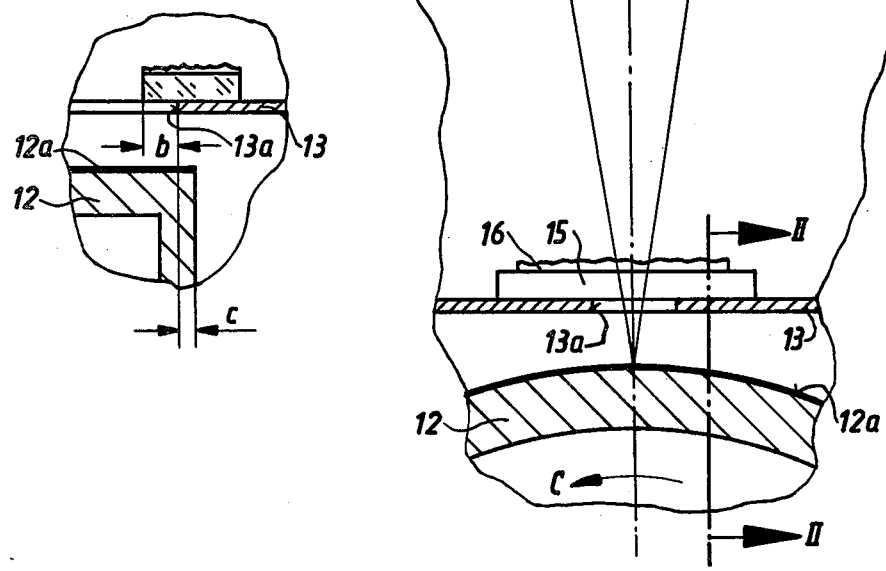
FIG. 2 is an enlarged-scale section taken on line II—II of FIG. 1.

An exemplary embodiment of the invention is disclosed in FIGS. 1 and 2. These show the invention embodied in an optical copier which may be of the electrostatic type. However, because such copiers are well known per se, only those elements have been illustrated which are necessary for an understanding of the invention.

The reference numeral 1 generally designates a housing of the copier in which there is mounted a carrier 2 for the usual scanning and reproducing lens system 3. The upper side of the housing 1 has mounted in it a carriage 4 which is movable (in suitable guides) in the direction of the double-headed arrow A–B; such carriages are known per se. The carriage 4 has an opening 4a in which there is mounted a transparent support plate 5 (of e.g. glass) onto which the original 6 to be copied (for example a book, as shown) is placed face down, so that the matter to be copied faces towards the lens system 3.

Plate 5 is held in position by an image-delimiting frame 7 which is provided with an abutment edge 7a; it is intended that an adjacent edge of the original 6 normally be moved into abutment with the edge 7a. However, as explained above, this will not always be the case and in conventional prior-art copiers the resulting gap between these edges will then be reproduced on the copy as a dark strip. How the invention avoids this, will be explained later. The underside 7b of the frame 7 has a light-reflecting characteristic (ability) which is as close as possible to that of the originals to be copied; to achieve this the underside 7b of frame 7 may e.g. be covered with a matte white lacquer or paint.

Light sources are required for illuminating the original 6. In the illustrated embodiment these sources are constituted by two tubular light sources 8 and 9 which are each mounted within the confines of a reflector 10 and 11, respectively. Located beneath the carrier 2 and lens system 3 is an endless (here cylindrical) intermediate copy carrier 12 which rotates in the direction of arrow C. As the carriage 4 with the original 5 thereon moves in the direction of arrow B, the lens system 3 reproduces the image of the original 6 on the light-sensitive surface 12a of the copy carrier 2. To assure a sharp image reproduction, the image is limited by the slot 13a of a slot-type diaphragm 13 to a portion of surface 12a which is sufficiently planar for a sharp reproduction, as indicated by the light rays emanating from lens system 3. This known per se and it will be appreciated that sequential strip-shaped portions of the original 6 are scanned by lens system 3 during movement of the carriage 4, and are imaged onto sequential strip-shaped portions of the travelling surface 12a. During this operation the carriage 4 and the carrier 12 are driven, in a manner also known per se, so as to travel at relative speeds corresponding to the imaging scale. Since the drives for this purpose are known, no illustration is considered to be necessary. After the copying operation is completed the carriage 4 is returned in the direction of arrow A, e.g. by means of a not-illustrated restoring spring, until it reaches its starting position.

To avoid the reproduction of a gap a between original 6 and edge 7a, in form of a dark strip on a copy being made of the original, the invention provides a strip 14 which is mounted below and extends parallel to the edge 7a. This strip 14 is secured to the underside of the plate 5, so that it can neither interfere with positioning of the original 6 nor become damaged by the latter. Strip 14 is transparent or semi-transparent and extends outwardly beyond the edge 7a, i.e. into the e.g. square or rectangular image field bounded by annular (e.g. square or rectangular) frame 7. Its underside facing towards the lens system 3 has a light-scattering surface, indicated in FIG. 1 by the wavy line. In the illustrated example the strip 14 is in form of a self-adhesive foil (of e.g. synthetic plastic) whose light-scattering surface is treated to be matte, i.e. to have an effect similar to a ground-glass screen.

However, the use of a separate strip 14 is not absolutely necessary. It would also be possible to coat a corresponding strip-shaped portion of the underside of plate 5 with a matte lacquer or paint, or else to make such area able to scatter light by etching or sandblasting it. What counts is that the strip 14 (or a corresponding surface portion of plate 14) be at least partially transmissive of light, that it have the ability to diffuse and scatter such light as penetrates through it, and that it not be located exactly in one of the focal planes of the lens system 3, i.e. not exactly in the plane of the original 6 (the plane of that surface of original 6 which is in contact with the plate 5) or of a copy, respectively not in the plane of the edges which delimit the image.

If these requirements are met, then such edges cannot be reproduced (on the surface 12a) as sharp lines or as shadows cast by the edges. Thus, the matte area constituted by the light-scattering surface of strip 14 (or its equivalent) appears on the surface 12a as a largely uniform white area; so reproduced on the surface 12a it causes a uniform discharge of the electrostatic charge of the surface 12a and, in consequence, prevents the formation of undesired dark areas on the copy being reproduced on a not-illustrated copy carrier.

A further advantageous measure according to the invention is best illustrated in FIG. 2, from which it will be seen that transparent strips 15 (e.g. self-adhesive synthetic plastic foil) are also secured to the upwardly directed side of the diaphragm 13, at the axial ends (one shown) of the slot 13a therein. The upper surfaces 16 of these strips 15 are again made matte, i.e. to scatter light. The strips 15 project inwardly beyond the edges bounding the slot 13a by a distance b, as shown. Should the end of the slot 13a correspond to the lateral edge of the copy, then light impinging upon an edge portion of the copy having the width b is scattered laterally, in such a manner that the edge region of the intermediate copy carrier 12 receives light up to its outermost edge, even if the carrier 12 projects beyond the lateral edge of the copy by a distance c or if (due to manufacturing tolerances or for other reasons) the lateral edge of the copy is displaced relative to the lateral edge of the carrier 12. In other words: the carrier 12 (e.g. a cylindrical drum) may always have the full width needed to permit a 1:1 reproduction of the original, without the changes that due to tolerance variations or for other reasons undesired toner deposits might form on the lateral edge of carrier 12 resulting from inadequate exposure.

It goes without saying that if the invention is embodied in a copier of the type in which the carriage 4 is omitted, i.e. where the original 6 remains stationary during copying, the plate 5, the frame 7 and the strip 14 will be mounted on stationary parts of the copier, e.g. of the housing thereof.

Resort to the present invention overcomes the prior-art drawbacks and offers advantages not attainable with the prior art. The optical transition between the edge 7a of the frame and the adjacent edge of the original 6 will always be unnoticeable on the copy and this will be largely independent of the light-reflecting characteristics of the original itself. The strip 14 can in no way interfere with the proper positioning of the original against the edge 7a and such positioning now need not be carried out any more with particular care, especially when the strip 14 extends inwardly beyond the edge 7a by about 1–5 mm (5 mm is currently preferred), since the gaps are often not wider than 1 mm, and gaps wider than 5 mm occur very rarely. The danger of losing any part of the original due to this 5 mm overlap of the strip 14 with the image field, is almost non-existent; the left-hand edge of originals which are printed, typed or intended to be placed into a file, usually has a margin of about 15 mm width, and even on other kinds of originals the printed, drawn or otherwise applied matter rarely comes closer than 5 mm to the left-hand edge of the original.

The use of reflective matter at the underside of frame 7, and of the strips 15 with their surfaces 16, and of a strip similar to strip 14 at an edge of frame 7 opposite to the edge 7a, assure that even the edge of the original which is opposite to the edge adjacent frame edge 7a, will not be reproduced on the copy with an accompanying dark strip, even if the cover (not shown) is not closed during the copying operation. This advantage is achieved without requiring special measures to coordinate the image-delimiting openings for the original and the surface 12a. Another advantage of the invention, besides those already mentioned, resides of course in the fact that the elimination of undesired dark strips or areas on the copies also eliminates the unnecessary use of toner which heretofore places an unnecessary burden on the toner removing device and which has in the past contributed to premature exhaustion of the toner supply.

While the invention has been illustrated and described as embodied in an optical copier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an optical copier, a combination comprising a transparent support for an original to be copied; an abutment edge in part delimiting an image area and against which the original should be, but sometimes is not abutted; optical means for scanning the original on said support to produce an image of the original for copying purposes; and an at least semi-transparent light-diffusing strip portion outside the focal plane of said optical means and adjacent said abutment edge, for preventing the reproduction of a gap between said abutment edge and original as a dark area on a copy being made of the original.

2. A combination as defined in claim 1, said strip portion comprising a strip having a light-diffusing surface.

3. A combination as defined in claim 1, said transparent support having one surface on which the original is adapted to rest, and another surface facing away from said one surface and toward said optical means; and wherein said strip portion is provided on said other surface.

4. A combination as defined in claim 3, wherein said strip portion comprises a strip forming part of said other surface and provided with a light-diffusing surface.

5. A combination as defined in claim 1, wherein said strip portion is a strip of synthetic-plastic material.

6. A combination as defined in claim 1, said strip portion comprising a strip having a light-diffusing surface and projecting beyond said abutment edge and into said image area by between about 1-5 mm.

7. A combination as defined in claim 1, said strip portion comprising a strip having a light-diffusing surface and projecting beyond said abutment edge and into said image area by about 5 mm.

8. A combination as defined in claim 1, said abutment edge being provided on a frame bounding said image area and having a side facing towards said optical means, and wherein said side has a light-reflecting factor corresponding substantially to the light-reflecting factor of originals from which copies are expected to be made with said optical copier.

9. A combination as defined in claim 8, said frame having at least one other abutment edge and said strip-portion also being provided adjacent said other edge and outside the focal plane of said optical means.

10. A combination as defined in claim 1, said optical means comprising a lens system and a diaphragm provided with an elongated slot having spaced ends; and further comprising strips of at least semi-transparent material overlying respective end portions of said slot adjacent said ends and having light-diffusing surfaces.

11. A combination as defined in claim 10, said light-diffusing surfaces facing towards said lens system.

* * * * *